United States Patent [19]

Knop

[11] 4,261,011
[45] Apr. 7, 1981

[54] COLOR SEPARATION PRODUCTION USING COLOR RECOGNITION CIRCUIT

[75] Inventor: Hans-Georg Knop, Heikendorf, Fed. Rep. of Germany

[73] Assignee: Dr. Ing. Rudolf Hell GmbH, Fed. Rep. of Germany

[21] Appl. No.: 102,542

[22] Filed: Dec. 11, 1979

[30] Foreign Application Priority Data

Dec. 12, 1978 [DE] Fed. Rep. of Germany ....... 2853511

[51] Int. Cl.$^3$ .............................................. G03F 3/08
[52] U.S. Cl. .................................................. 358/75
[58] Field of Search ...................... 358/75, 80; 356/407

[56] References Cited

U.S. PATENT DOCUMENTS 3,210,552  10/1965  Young ................................. 250/226
4,110,826  8/1978   Möllgaard et al. .................... 358/75

FOREIGN PATENT DOCUMENTS 1522950  8/1978  United Kingdom .

*Primary Examiner*—John C. Martin
*Attorney, Agent, or Firm*—Hill, Van Santen, Steadman, Chiara & Simpson

[57] ABSTRACT

The invention relates to a method for producing line and continuous tone color separations of pattern models of textile, decoration or packaging printing and the like, and further relates to a color scanner. A characteristic color recognition signal for controlling the recording is obtained by color recognition for each pattern color from the color measured value signals gained by opto-electric scanning of the pattern models. For the production of line color separations, an adjustable color separation signal, which corresponds to the desired recording density, is prescribed. For the production of continuous-tone color separations, a run signal, dependent on the color saturation and/or brightness of a color in the pattern model, is derived from at least one measured color value signal and the corresponding color separation signal is derived therefrom. In the recording of the color separation of a color, the color recognition signal of this color controls the color separation signal in such a manner that the color separation signal is switched on, given the presence of the concerned color in the pattern model, and is switched off when that color is not present.

13 Claims, 2 Drawing Figures

COLOR SEPARATION PRODUCTION USING COLOR RECOGNITION CIRCUIT

BACKGROUND OF THE INVENTION

1. Field of the Invention

This invention relates to a method and apparatus for the production of color separations for textile, decoration or packaging printing and the like in which a colored pattern model is trichromatically scanned point-by-point and line-by-line for the generation of color signals and is then again recorded.

2. Description of the Prior Art

Whereas the color application on a printing medium in multi-color mixed printing occurs by means of the superimposed printing of different components of the separation colors magenta, cyan and yellow, in textile, decoration and packaging printing and the like, each color to be printed is mixed before the printing process, in most use cases, and are then separately transferred to the printing medium.

The pattern models for the above-mentioned types of printing, for example, exhibit color areas residing separately next to one another of different coloration with a homogeneous color distribution within the color areas (full tone color area). In this case, line color separations are produced for the individual pattern colors with the assistance of a color scanner, which line color separations supply specific information concerning the local distribution of the pattern colors in the pattern model.

Other pattern models with color areas likewise residing separately next to one another of different coloration exhibit an analog graduated color distribution, i.e., differing color saturation and/or brightness within the individual color areas graduated tone color areas). However, pattern models also occur which are designed vignetting and two-dimensional, or which exhibit a multitude of vignetting colors randomly verging into one another. In these cases, analog graduated color separations like continuous tone or half-tone color separations must be produced for the individual pattern colors, which color separations supply specific information concerning both the local distribution of the pattern colors in the pattern model and specific information concerning the amount of color.

A color recognition circuit and its use in a color scanner for recording color separations for the above types of printing is already known from the British Pat. No. 1,522,950, which is fully incorporated herein by this reference.

In such a color scanner, three primary measured color value signals are obtained by means of point-by-point and line-by-line optoelectronic pattern scanning, which measured color value signals represent the color components red, green and blue of the scanned image points. The color recognition circuit charged with the measured color value signals selects the individual pattern colors and generates specific output signals which modulate the brightness of recording lamps, as recording organs, as color separation signals. The recording lamps expose a recording medium in the form of films point-by-point and line-by-line, which films, after development, represent the desired, screened or unscreened color separations for the production of the printing forms.

In the mentioned color recognition circuit, the individual color recognition areas into which the entire color space is divided are respectively marked by means of the position of a barycentric color and by means of shape, extent and orientation in the color space. The color separation signal generated for each pattern color is a function of the distance of a color location from the color location of the selected barycentric color, whereby the color separation signal has a maximum value at the barycentric color, decreases towards the limits of the color recognition area and becomes zero at the specific limits. The respective color separation signals supplies specific information concerning the color saturation and/or brightness in a graduated tone color area and is proportional to the density in the appertaining color separation to be recorded.

The known arrangement has the disadvantage that the color recognition areas which can be set in the color recognition circuit specified cannot be optimally matched in terms of form and size to the spatial color regions given by the vignetting colors of the pattern model. For this reason, color errors in the production of the color separations cannot be entirely avoided. It is further disadvantageous that whether or not the barycentric color within a color area of the pattern model was properly selected or not can only be determined on the basis of a recorded color separation and that the most favorable barycentric color can often only be found by means of the exposure of a plurality of color separation proofs.

SUMMARY OF THE INVENTION

The object of the invention is therefore to provide a method and an arrangement for the production of color separations for textile, decoration or packaging printing and the like which the above-mentioned disadvantages are eliminated.

BRIEF DESCRIPTION OF THE DRAWINGS

Other objects, features and advantages of the invention, its organization, construction and operation will be best understood from the following detailed description, taken in conjunction with the accompanying drawings, on which

DESCRIPTION OF THE PREFERRED EMBODIMENTS

Figure 1:
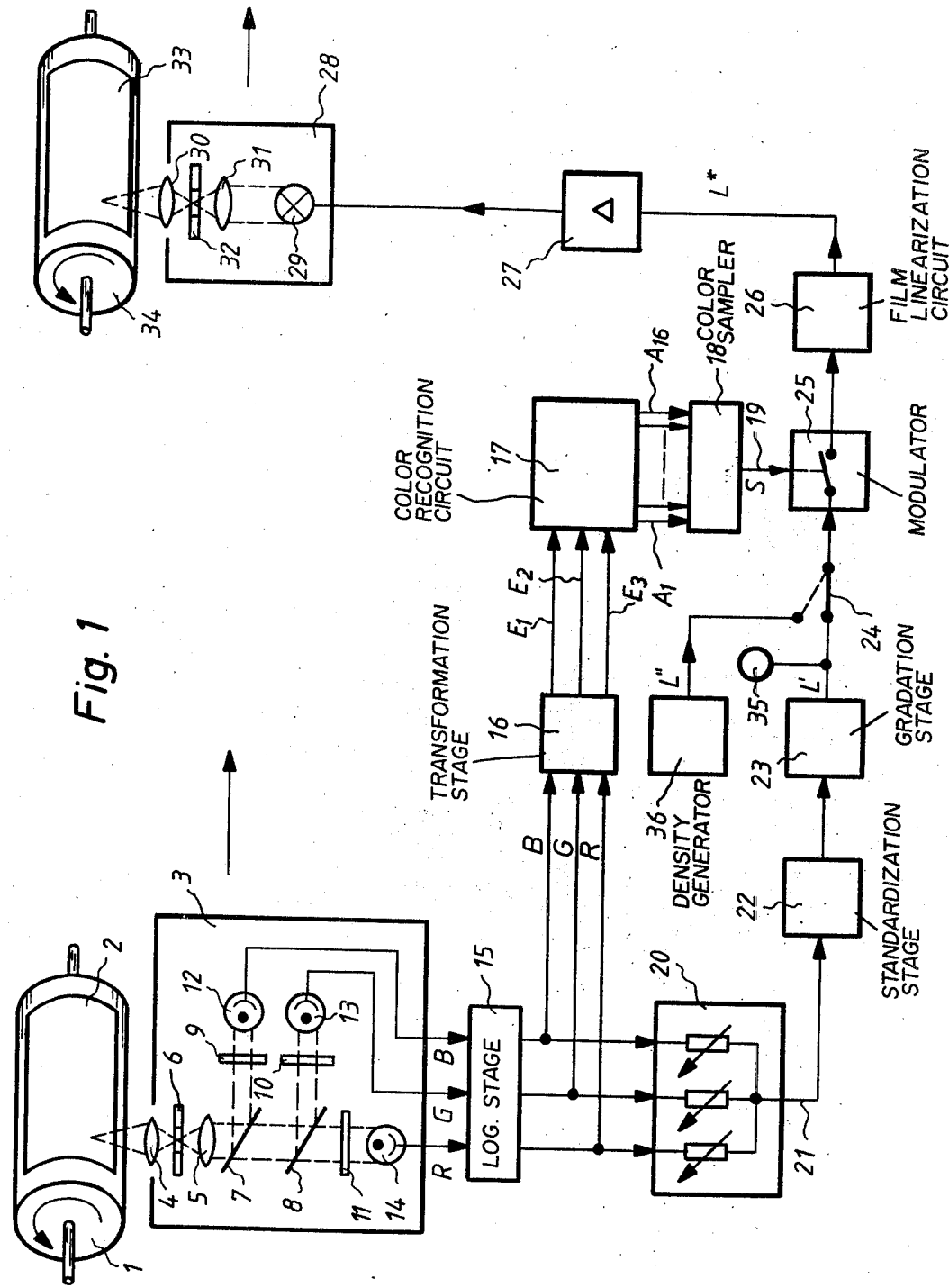
FIG. 1 is a schematic representation of an embodiment of an arrangement for the production of color separations.

FIG. 1 illustrates an arrangement for the production of color separations for textile, decoration or packaging or the like (color scanner).

The arrangement is particularly for the processing of pattern models which comprise a multitude of color areas residing next to one another of different coloration, whereby the individual color areas per se exhibit differing color saturation and/or brightness (graduated tone color areas). Of course, color separations of pattern models can also be produced whose color areas have constant saturation and brightness (full tone color areas).

A pattern model 2 is mounted on a rotating scanning drum 1, the pattern model 2 being scanned point-by-point and line-by-line by a scanning element 3. The scanning light reflected from the pattern model 2 in a reflective scanning arrives in the scanning element 3 via a pair of lenses 4 and 5 and an intermediate diaphragm 6 and is divided into three partial beams by means of two partially silvered mirrors 7 and 8. The partial beams pass through a plurality of color filters 9, 10 and 11 and strike three opto-electric transducers 12, 13 and 14 which convert the light received into three primary color measured value signals R, G and B (red, green and blue).

The measured color value signals R, G and B, under certain conditions, are logarithmicized or partially logarithmicized in a logarithmicizing stage 15 and are supplied to a transformation stage 16 and are there converted into the color signals $E_1$, $E_2$ and $E_3$. If needed, the conversion can correspond to a transformation of the RGB coordinates into the chrominance/luminance coordinates, or into the luminance/saturation/hue coordinates. Coordinate transformations of this type, for example, are known from H. Schönfelder, *Fernsehtechnik I*, Liebig Verlag Darmstadt, Pages 3/13, 3/14 and 3/14B.

In order to separate the colors occurring in the pattern model 2, a color recognition circuit 17 is provided which has the color signals $E_1$, $E_2$ and $E_3$ applied thereto. The color recognition circuit 17, for example, is constructed in accordance with the U.S. Pat. No. 4,110,826. The color recognition areas into which the color space is divided are simulated by means of adjustable electronic threshold circuits for the color signals $E_1$, $E_2$ and $E_3$. The adjustment of the threshold circuit occurs in such manner that the recognition areas are matched as well as possible to the color regions of the individual colors to be separated. The color recognition circuit 17 examines as to which color recognition areas the color signals obtained in the pattern scanning are to be assigned and then emits corresponding output signals A which supply a yes/no statement concerning the presence of a pattern color to be separated. With the color recognition circuit 17, for example, designed for the discrimination of 16 pattern colors, it then generates 16 output signals $A_1$–$A_{16}$ which are supplied to a color sampler 18. For exactly what pattern color a color separation is to be recorded is pre-selected at the color sampler 18. The color sampler 18 then connects through the output signal A assigned to the appertaining pattern color as control a signal S which appears on a line 19.

For trichromatic or quadrochromatic fabric printing or mixed color printing, it is sometimes desirable to combine a plurality of pattern colors into a separation color, for example, to combine light red and dark red into "red". In this case, a plurality of output signals A can be united to form the control signal S by means of the color sampler 18.

At the same time, the color measured value signals R, G and B obtained in the scanning element 3 are fed to a run signal encoder 20, in which a run signal L is generated on a line 21 from at least one of the measured color value signals (filter signals). The run signal L can also be a filter signal.

In the exemplary embodiment, the run signal L is derived from selectable components of the three measured color signals R, G and B according to the equation $$L = a_1 R + a_2 G + a_3 B.$$

Given a corresponding logarithmicization of the measured color value signals and selection of the coefficients $a_1$, $a_2$ and $a_3$, the run signal then corresponds to the brightness signal.

As illustrated in FIG. 1, a run signal encoder 20 comprises a resistor grid whose resistances are weighted in accord with the coefficients $a_1$, $a_2$ and $a_3$. The run signal encoder 20, however, can also be a standard color computer for mixed color separations as is described, for example, in the U.S. Pat. No. 3,885,244, which is fully incorporated herein by this reference.

Whereas the output signals A of the color recognition circuit 17 supply specific information concerning the hue or, respectively, coloration range of the graduated tone color areas in the pattern model, the run signal is a measure for the color saturation or brightness, i.e. for the graduation or run in these color areas.

According to the invention, the run signal L and/or the control signal S control the recording of the color separations.

In order to record color separations of the pattern models with vignetting colors, the run signal L arrives on line 21 via a standardization stage 22 and a gradation stage 23 to a transfer device 24. By way of a modulator 25 and a film linearization circuit 26 which, for example, is constructed in accordance with the U.S. Pat. No. 4,075,662 fully incorporated herein by this reference, the run signal L is fed to a final amplifier 27 and is further fed from there to a recording element 28. The run signal L, modified in the individual stages, modulates a recording lamp 29 of the recording element 28 in terms of its brightness. By way of a pair of lenses 30 and 31 and via a recording diaphragm 32, the recording lamp 29 exposes a recording medium 33, in the form of a film, point-by-point and line-by-line the film 33 being likewise mounted on a rotating recording drum 34. The exposed and developed film 33 is the desired color separation for production of the printing forms.

In the following, the individual stages will be described in greater detail.

The minimum and the maximum run value L are set in the standardization stage 22 in such manner that the desired final densities are achieved on the film 33. To this end, an image location of maximum color saturation and an image location of minimum color saturation are scanned in succession in a graduated tone color area. Whereas the final densities set represent the corner values of the standardized run signal L', the signal shape between these corner values, which is determined per se by means of the color saturation distribution within the color area, can be changed in the post-connected gradation stage 23. The standardized run signal L' can be displayed at a suitable measuring device.

In the exemplary embodiment illustrated in FIG. 1, the modulator 25 is embodied as a switch for the run signal L', which swith is actuated by means of the control signal S on the line 19.

During the recording of the color separation of the individual color selected at the color sampler 18, the run signal L' is only connected through to the recording element 28 as a color separation signal when the individual color concerned is perceived in the scanned pattern model 2.

However, the color separation signal can also be mixed from the run signal L', and the control signal S or can be multiplicatively generated. In this case, the modulator 25 is a suitable mixer circuit, or a multiplier.

For the color separation of a pattern color therefore, the control signal S supplies specific information concerning the local distribution of this pattern color in the pattern model and the run signal L', by means of the recording density, supplies specific information concerning the color amounts for reproduction of the graduations of shade or tone.

When line color separations are to be produced for pattern models with full tone color areas, the transfer device 24 is situated in the position indicated with broken lines and a constant signal L" (constant recording density) generated in an adjustable density generator 36 is supplied via the transfer device 24 to the recording element 28. The control signal S then supplies information concerning the local distribution of one pattern color in the pattern model.

In this manner, line color separations can also be produced from pattern models with bleeding surfaces when the color recognition circuit 17 is correspondingly adjusted.

Figure 2:
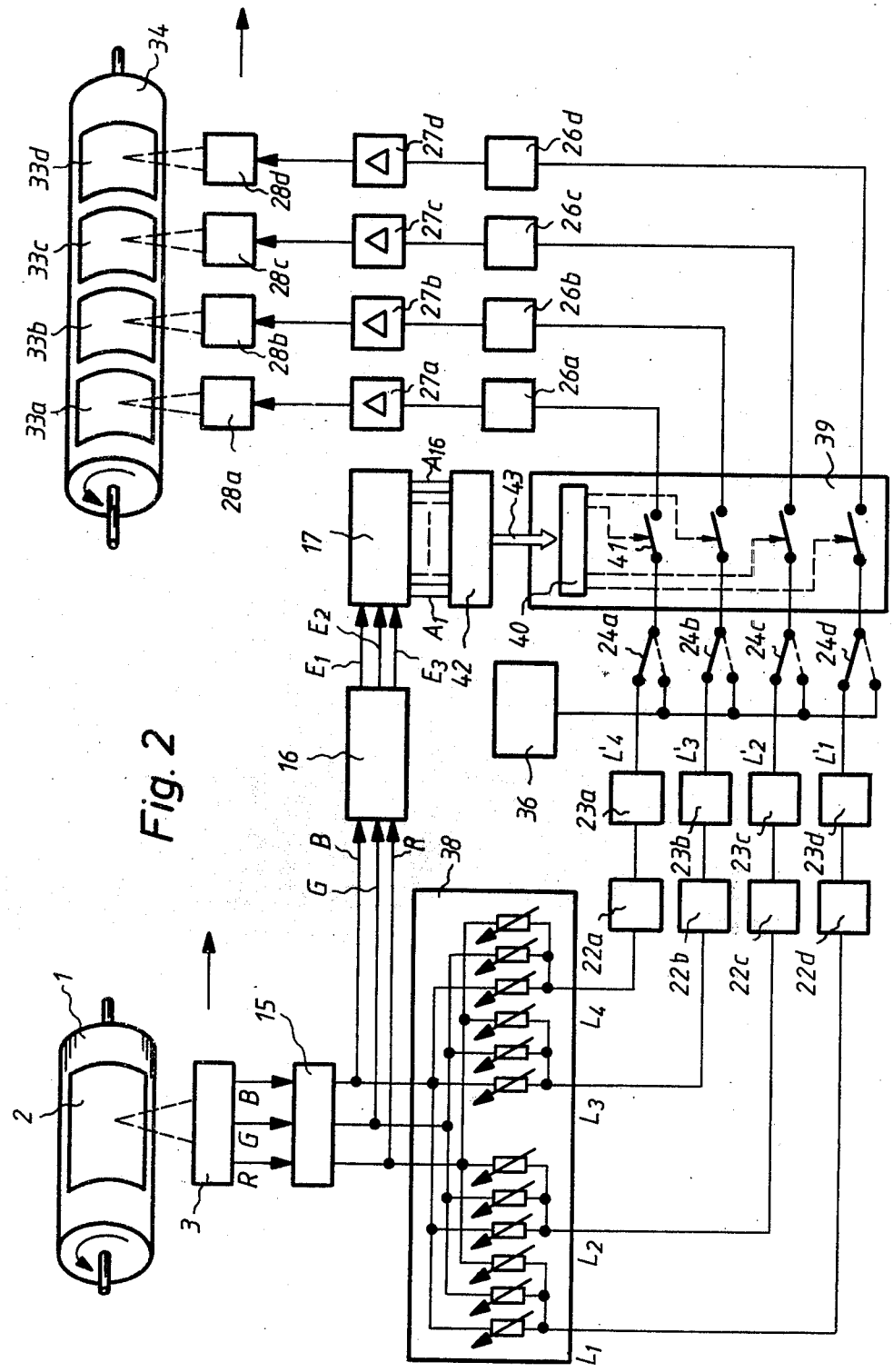
FIG. 2 is a schematic representation of an advantageous further development of the invention.

FIG. 2 illustrates an advantageous variation of the arrangement according to FIG. 1 with which the appropriate color separations can be simultaneously produced for a plurality of pattern colors. One or more run signals, for example, four run signals $L_1-L_4$ are generated in the run signal encoder 38 from selectable components of the measured color value signals R, G and B gained-in the scanning element 3. These run signals can also be tapped at the standard four outputs of a color computer for mixed colors. The run signals, as is described in FIG. 1, are standardized in separate channels, are subjected to a gradation change and are supplied, in common, to a multiple switch 39. The multiple switch 39, for example, is constructed of an integrated analog multiplexer of the type 506 of the Siliconix Company. The analog multiplexer, in turn, comprises a binary coded decimal (BCD) decoder 40 and of a plurality of integrated metal-oxide-semiconductor (MOS) field effect transistors, as a plurality of switches 41.

A modified color sampler 42, including a coder, is post-connected to the color recognition circuit 17, the color sampler 42 with the coder converting the 16 output signals of the color recognition circuit 17 into digital 4-bit color numbers.

Again, those pattern colors or, respectively, color numbers can be selected at the color sampler 42, for which the color separations are to be simultaneously recorded. Likewise, a plurality of pattern colors can also be combined into one separation color.

For controlling the recording, the color sampler 42 is connected by way of a data line 43 to the decoder 40 in the multiple switch 39. The multiple switch 39, controlled by the color numbers called in, respectively connects through the corresponding run signal and supplies the same to the appertaining recording elements 28a–28d. The recording elements 28a–28d simultaneously expose four color separations on a plurality of films 33a–33d, which are arranged on a common drum, or an four separate synchronously rotating drums.

When the transfer device 24 is situated in the position indicated with broken lines, a plurality of line color separations can again be recorded simultaneously.

It lies within the framework of the invention to serially record a plurality of color separations simultaneously with one one recording element, upon intermediate storage of the signals. In this case, the films to be exposed are arranged amongst one another on the circumference of the recording drum.

The invention is not limited to the production of color separations for the mentioned types of printing.

Although I have described my invention by reference to different embodiments thereof, many changes and modifications of the invention may become apparent to those skilled in the art without departing from the spirit and scope of the invention. I therefore intend to include within the patent warranted hereon all such changes and modifications as may become apparent to those skilled in the art.

I claim:

1. A method for the production of color separations for textiles, decoration or packaging printing and the like in which a colored pattern model is trichromatically scanned point-by-point and line-by-line for obtaining color signals, and is then recorded again, comprising the steps of:

producing a first signal from the color signals in response to the presence of at least one color of the pattern model by color recognition;

producing a second signal determining the recording density which is to be recorded; and generating from the first and second signals a color separation signal for controlling the recording of a specific color.

2. The method of claim 1, comprising the further step of:

applying the first signal to switch on the second signal in the presence of at least one color in the pattern and switching it off in the absence of that color.

3. The method of claim 2, wherein the step of producing the first signal is further defined as: generating an identification signal for each color of the pattern model by color recognition; selecting the identification signal of the color to be recorded; and applying the selected identification signal as the first signal.

4. The method of claim 3, comprising the further step of:

combining a plurality of the identification signals to form the first signal.

5. The method of claim 3, wherein the step of producing the second signal is further defined as:

generating a constant value signal for recording line color separations.

6. The method of claim 3, for recording color separations, comprising the further steps of:

generating a run signal in dependence on the color saturation and/or brightness of the colors of the pattern model from at least one color signal; and deriving the second signal from the run signal.

7. The method of claim 6, comprising the step of:

assigning signal values for the final recording densities to the run values for the locations of minimum and maximum color saturation in one color.

8. The method of claim 7, comprising the further step of:

grading the second signal with respect to the run signal.

9. The method of claim 3, wherein, for the simultaneous recording of color separations for a plurality of colors of the pattern model, comprising the steps of:

generating a corresponding plurality of the second signals; and applying the identification signals to switch through the second signals as color separation signals.

10. An arrangement for the production of color separations for textiles, decoration or packaging printing and the like in which a color pattern model is trichromatically scanned with a color scanner point-bypoint and line-by-line to obtain color signals, and is then re-recorded by a recording unit, comprising:

a color recognition circuit connected to the color scanner for generating color identification signals in response to the color signals;

a first generating circuit connected to said color recognition circuit for generating a first signal in response to at least one color present in the pattern model;

a second generating circuit for generating a second signal for determining the color density to be recorded; and a modulator connected to the recording unit and to said first and second generating circuits for modulating the second signal with the first signal.

11. The arrangement of claim 10, wherein said modulator comprises:

a switch including a first input connected to said second generating circuit, a control second input connected to said first generating circuit, and an output connected to the recording unit.

12. The arrangement of claim 10, wherein said second generating circuit comprises:

an adjustable voltage generator.

13. The arrangement of claim 10, wherein said second generating circuit comprises:

a run signal encoder for generating a run signal in response to at least one color signal.

* * * * *